United States Patent
Schoenenborn

(10) Patent No.: US 9,835,166 B2
(45) Date of Patent: Dec. 5, 2017

(54) ARRAY OF FLOW-DIRECTING ELEMENTS FOR A GAS TURBINE COMPRESSOR

(71) Applicant: MTU Aero Engines AG, Munich (DE)

(72) Inventor: Harald Schoenenborn, Karlsfeld (DE)

(73) Assignee: MTU Aero Engines AG, Munich (DE)

( * ) Notice: Subject to any disclaimer, the term of this patent is extended or adjusted under 35 U.S.C. 154(b) by 324 days.

(21) Appl. No.: 14/508,650

(22) Filed: Oct. 7, 2014

(65) Prior Publication Data

US 2015/0139789 A1    May 21, 2015

(30) Foreign Application Priority Data

Oct. 8, 2013 (EP) .................................... 13187637

(51) Int. Cl.
| | |
|---|---|
| *F01D 5/16* | (2006.01) |
| *F04D 29/40* | (2006.01) |
| *F04D 29/32* | (2006.01) |
| *F04D 29/18* | (2006.01) |

(52) U.S. Cl.
CPC ............. *F04D 29/403* (2013.01); *F01D 5/16* (2013.01); *F04D 29/185* (2013.01); *F04D 29/324* (2013.01); F05D 2230/10 (2013.01); F05D 2260/961 (2013.01); Y02T 50/673 (2013.01); Y10T 29/4932 (2015.01); Y10T 29/49336 (2015.01)

(58) Field of Classification Search
CPC .... F04D 29/403; F04D 29/185; F04D 29/324; F01D 5/16; F05D 2230/10; F05D 2260/961

USPC ....................................................... 415/208.1
See application file for complete search history.

(56) References Cited

U.S. PATENT DOCUMENTS

| | | | | |
|---|---|---|---|---|
| 5,165,849 | A | * | 11/1992 | Nakagawa ............ F04D 29/462 415/148 |
| 2008/0134504 | A1 | | 6/2008 | Schoenenborn |
| 2008/0145228 | A1 | | 6/2008 | Truckenmueller et al. |
| 2009/0067978 | A1 | * | 3/2009 | Suljak, Jr. ............. F01D 17/162 415/1 |

(Continued)

FOREIGN PATENT DOCUMENTS

| | | |
|---|---|---|
| DE | 10 2009 053247 | 5/2011 |
| EP | 1 211 382 | 6/2002 |

(Continued)

*Primary Examiner* — Aaron R Eastman

(74) *Attorney, Agent, or Firm* — Davidson, Davidson & Kappel, LLC

(57) ABSTRACT

An array of flow-directing elements for a compressor of a gas turbine including at least one first flow-directing element and at least one second flow-directing element different from the first flow-directing element; the flow-directing elements each having a leading edge facing the gas turbine inlet, a trailing edge, a pressure side connecting them and located ahead in the direction of rotation, a suction side located opposite thereof, as well as successive chords along a stacking axis; the flow-directing elements each extending between an airfoil root proximate to the rotor and an airfoil tip remote from the rotor. The trailing edge of the first flow-directing element is, at least in a portion thereof, axially offset from the trailing edge of the second flow-directing element in a direction toward the leading edge at least in a half proximate to the airfoil tip.

19 Claims, 1 Drawing Sheet

(56) References Cited

U.S. PATENT DOCUMENTS

| | | | | |
|---|---|---|---|---|
| 2010/0247310 A1* | 9/2010 | Kelly | ................ | F01D 5/10 |
| | | | | 416/1 |
| 2012/0148401 A1* | 6/2012 | Kulathu | ................ | F01D 5/10 |
| | | | | 416/1 |
| 2013/0209223 A1* | 8/2013 | Gomez | ................ | F01D 1/04 |
| | | | | 415/68 |

FOREIGN PATENT DOCUMENTS

| EP | 2 072 758 | 6/2009 |
|---|---|---|
| WO | WO 2006/084438 | 8/2006 |

\* cited by examiner

ARRAY OF FLOW-DIRECTING ELEMENTS FOR A GAS TURBINE COMPRESSOR

This claims the benefit of European Patent Application EP 13 187 637.7, filed Oct. 8, 2013 and hereby incorporated by reference herein.

The present invention relates to an array of flow-directing elements for a compressor of a gas turbine, and to a gas turbine, in particular an aircraft engine gas turbine, having a compressor stage including such an array of flow-directing elements, as well as to a method for designing such an array of flow-directing elements.

BACKGROUND

It is known from EP 1 211 382 A2 that flutter may occur in compressors. To reduce this, EP 1 211 382 A2 proposes rotor blades having different natural frequencies.

In addition to such structural mistuning, it is further known from US 2010/0247310 A1 to mistune the rotor blades by providing them with different thicknesses on the pressure side.

Both publications deal with normal flow through the compressor; i.e., a flow towards the airfoil leading edges. However, during the so-called "pumping", the direction of flow may briefly reverse. Flutter may occur here as well.

SUMMARY OF THE INVENTION

It is an object of an embodiment of the present invention to improve a gas turbine.

The present invention provides a gas turbine, in particular an aircraft engine gas turbine, has one or more compressor stages, preferably high-pressure compressor stages, which are disposed downstream of one or more low-pressure compressor stages.

At least one, preferably all, of the (high-pressure) compressor stages have at least one array of flow-directing elements including one or more first flow-directing elements and one more second flow-directing elements different from the first flow-directing elements. In one embodiment, the array of flow-directing elements may be a rotor blade array rotating in the circumferential direction during operation. In a refinement, a stator vane array, in particular a fixed stator vane array, may be disposed downstream thereof. In one embodiment, the array of flow-directing elements may be also a stator vane array. Thus, the flow-directing elements of the array, in particular the first and second flow-directing elements, may in particular be rotor blades or stator vanes.

A first flow-directing element, in particular a rotor blade or stator vane, may be circumferentially adjacent to a second flow-directing element, in particular a rotor blade or stator vane, at one or both sides thereof. Thus, first and second flow-directing elements may in particular be arranged in alternate relationship. Similarly, third, and possibly further flow-directing elements, in particular rotor blades or stator vanes, may be arranged between the first and second flow-directing element(s). Thus, the array of flow-directing elements may in particular have, and, more particularly, be formed of, one or more groups of first, second, third (and possibly further second) flow-directing elements, in particular rotor blades or stator vanes.

The first and second flow-directing elements each have an (airfoil) leading edge facing the gas turbine inlet, an (airfoil) trailing edge facing away from the gas turbine inlet, an (airfoil) pressure side connecting them and located ahead in the direction of operational rotation, an (airfoil) suction side located opposite thereof, as well as successive chords along a stacking axis. Furthermore, the first and second flow-directing elements each extend between an airfoil root located proximate to or remote from the rotor and an airfoil tip which is located proximate to or remote from the rotor and may be free-standing or connected by a shroud. In one embodiment, in particular if the array of flow-directing elements is a rotor blade array; i.e., if the flow-directing elements are rotor blades, the airfoil root(s) is/are proximate to the rotor and the airfoil tip(s) is/are remote from the rotor in the context of the present invention. Analogously, in one embodiment, in particular if the array of flow-directing elements is a stator vane array; i.e., if the flow-directing elements are stator vanes, the airfoil root(s) is/are remote from the rotor and the airfoil tip(s) is/are proximate to the rotor in the context of the present invention. However, in one embodiment, if the array of flow-directing elements is a stator vane array; i.e., if the flow-directing elements are stator vanes, it is also possible for the airfoil root(s) to be proximate to the rotor and for the airfoil tip(s) to be proximate to the rotor in the context of the present invention.

In accordance with an aspect of the present invention, the trailing edge(s) of the first flow-directing element(s) is/are axially offset from the trailing edge(s) of the second flow-directing element(s) in a direction toward the leading edge in a half proximate to the airfoil tip, either over the entire half proximate to the airfoil tip or in one or more portions thereof.

If the array of flow-directing elements has one or more third flow-directing elements, the trailing edge(s) thereof may also be axially offset from the trailing edge(s) of the first and/or second flow-directing element(s) in a direction toward the leading edge, either over the entire half proximate to the airfoil tip or in one or more portions thereof.

Thus, in one embodiment, flow-directing elements are aerodynamically mistuned for pumping; i.e., a brief and/or generally unwanted backflow or flow toward the trailing edges instead of the leading edges of the array of flow-directing elements, in order to reduce, preferably prevent, flutter during pumping. Since the stagnation point during pumping occurs in the upper airfoil region near the trailing edge, flutter during pumping can be reduced, preferably prevented, by varying the trailing edges between the first and second (and, if present, third and possibly further) flow-directing elements in accordance with the present invention.

In one embodiment, the trailing edge(s) of the first flow-directing element(s) is/are axially offset from the trailing edge(s) of the second flow-directing element(s) in a direction toward the leading edge in a third, in particular a quarter, proximate to the airfoil tip, either over the entire third or quarter proximate to the airfoil tip or in one or more portions thereof.

If the array of flow-directing elements has one or more third flow-directing elements, the trailing edge(s) thereof may also be axially offset from the trailing edge(s) of the first and/or second flow-directing element(s) in a direction toward the leading edge, either over the entire third or quarter proximate to the airfoil tip or in one or more portions thereof.

In one embodiment, the trailing edge(s) is/are offset only in the half proximate to the airfoil tip, in particular only in the third or quarter proximate to the airfoil tip, while in the half remote from the airfoil tip, or in the two thirds or three quarters remote from the airfoil tip, they are at least substantially identical. In another embodiment, the trailing edge(s) is/are axially offset toward the leading edge also over the entire half remote from the airfoil tip or in one or more portions thereof.

Thus, advantageously, the aerodynamics of the array of flow-directing elements are only slightly affected during normal forward flow.

The above region-specifying terms half, third and quarter refer in particular to an airfoil height between the airfoil root and the airfoil tip and, accordingly, denote, in particular, the radial region between 50% (half), 67% (a third), or 75% (quarter), and 100% of a radial airfoil height between the airfoil root and the airfoil tip as measured from or toward a rotor axis.

In one embodiment, the trailing edge(s) of the first flow-directing element(s) is/are axially offset from the trailing edge(s) of the second flow-directing element(s) in a direction toward the leading edge, either over the entire half proximate to the airfoil tip, in particular the entire third or quarter proximate to the airfoil tip, or in one or more portions thereof, by at least 0.5%, in particular at least 1%, of a chord length of the first or second flow-directing element(s) between the leading and trailing edges. Additionally or alternatively, in one embodiment, the axial offset may be no greater than 15%, in particular no greater than 10%, of the chord length.

If the array of flow-directing elements has one or more third flow-directing elements, the trailing edge(s) thereof may also be axially offset from the trailing edge(s) of the first and/or second flow-directing element(s) in a direction toward the leading edge, either over the entire half proximate to the airfoil tip, in particular the entire third or quarter proximate to the airfoil tip, or in one or more portions thereof, by at least 0.5%, in particular at least 1%, and/or no more than 15%, in particular no more than 10%, of the chord length of the first, second or third flow-directing element(s).

As used herein, a "chord length" is understood to mean the distance between the leading and trailing edges at the respective radial height, in particular the length of the distance between the leading and trailing edges or the axial distance between the leading and trailing edges.

Thus, advantageously, the aerodynamics of the array of flow-directing elements are only slightly affected during normal forward flow and, at the same time, flutter during pumping is reduced, preferably prevented.

In one embodiment, the trailing edge(s) of the first flow-directing element(s) is/are offset from the trailing edge(s) of the second flow-directing element(s) over the entire half proximate to the airfoil tip, in particular the entire third or quarter proximate to the airfoil tip, in particular in a monotonically increasing fashion, preferably in a strictly monotonically increasing fashion. In other words, the axial offset increases from the airfoil root to the airfoil tip without decreasing in the opposite direction in any region (monotonically), in particular without the trailing edge being parallel to a radial direction in any region (strictly monotonically).

In this manner, advantageous aerodynamics can be achieved, especially during normal flow and/or backflow in the opposite direction.

In addition to the aforedescribed aerodynamic mistuning for pumping through variation of the trailing edges, the first and second (and, if present, third and possibly further) flow-directing elements may also be structurally mistuned with respect to one another.

In particular, the first and second (and, if present, third) flow-directing element(s) may have different natural frequencies. In a refinement, this may be accomplished through variation of the stiffness, mass distribution and/or area moments of inertia. The different natural frequencies may in particular be bending and/or torsional natural frequencies and/or first, second and/or higher natural frequencies; i.e., in particular, different first, second and/or higher bending and/or torsional natural frequencies. In one embodiment, the different natural frequencies differ by at least 1%, in particular at least 2%, and/or no more than 20%, in particular no more than 7%.

Thus, the aforedescribed aerodynamic mistuning can in particular be increased through structural mistuning.

In one embodiment, the cutback of the trailing edge(s) of the first flow-directing element(s) reduces the aerodynamic load thereon during pumping. Thus, in a refinement, the first flow-directing element(s) may have a different, in particular lower bending stiffness and/or torsional stiffness than the second flow-directing element(s), in particular at least in a half proximate to the trailing edge and to the airfoil tip.

BRIEF DESCRIPTION OF THE DRAWINGS

Further advantageous features of the present invention will be apparent from the dependent claims and the following description of preferred embodiments. To this end, the drawings show, partly in schematic form, in:

DETAILED DESCRIPTION

Figure 1:
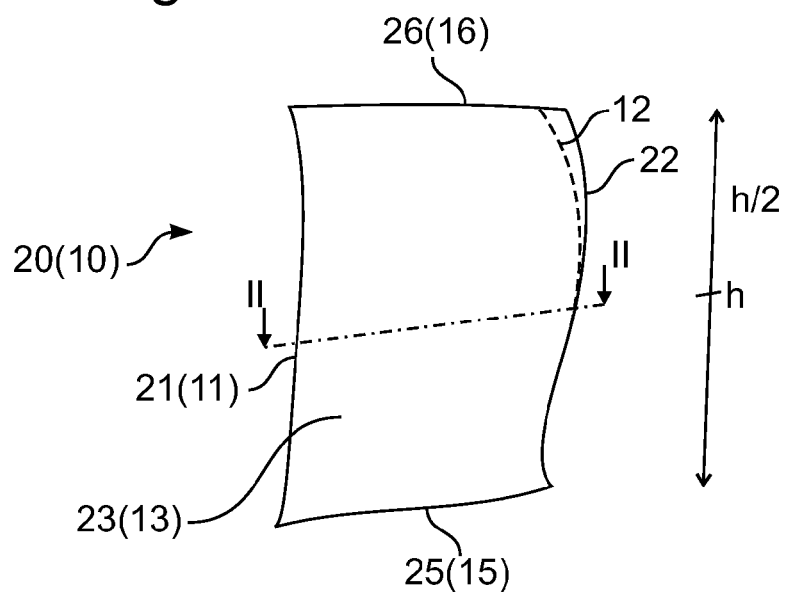
FIG. 1 airfoils of flow-directing elements of an array of flow-directing elements of a compressor of an aircraft engine gas turbine according to an embodiment of the present invention in a perspective view opposite to a circumferential direction or direction of rotation.

FIG. 1 shows (in detail), in a perspective view opposite to a circumferential direction or direction of rotation U (see FIG. 2), firstly an airfoil of a second flow-directing element 20 of an array of flow-directing elements of a compressor of an aircraft engine gas turbine according to an embodiment of the present invention and an airfoil of an adjacent first flow-directing element 10 of the array of flow-directing elements. For purposes of illustration, the airfoil of first flow-directing element 10 is shown (in dashed lines) superimposed on, or circumferentially rotated onto, the airfoil of second flow-directing element 20, and the features of the airfoil of first flow-directing element 10 are designated by reference numerals in parentheses. First and second flow-directing elements are arranged alternately in the circumferential direction and may be rotor blades or stator vanes. Accordingly, the array of flow-directing elements may by a rotor blade array or a stator vane array.

First and second flow-directing elements 10, respectively 20, each have a leading edge 11, respectively 21, facing the gas turbine inlet, a trailing edge 12, respectively 22, facing away from the gas turbine inlet, a pressure side 13, respectively 23, connecting them and located ahead in the direction of operational rotation U, a suction side 14, respectively 24, located opposite thereof (see FIG. 2), as well as successive chords along a stacking axis, and extend radially (from bottom to top in FIG. 1) between an airfoil root 15, respectively 25, proximate to the rotor and an airfoil tip 16, respectively 26, remote from the rotor.

Figure 2:
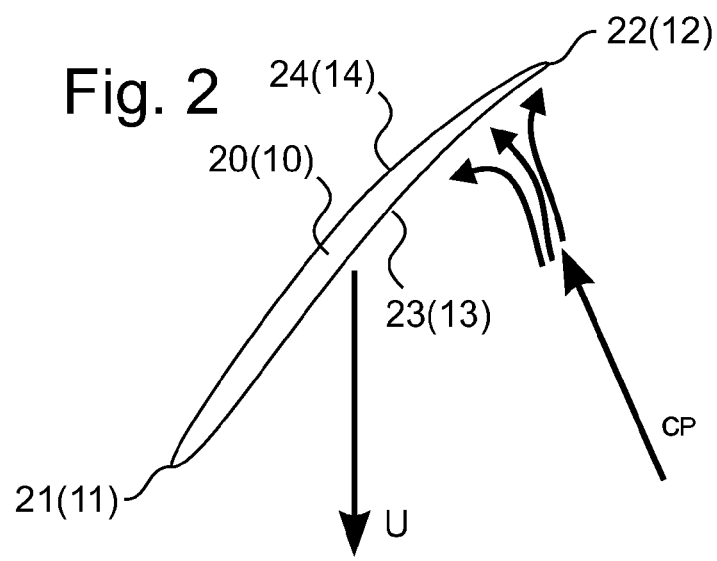
FIG. 2 a sectional view along line II-II in FIG. 1.

Also shown in FIG. 2 is a normal flow $c_N$ incident onto the airfoil leading edges, as well as a backflow $c_P$, such as occurs during pumping of the compressor. As can be seen from the plotted flow lines, a stagnation point of this backflow occurs in the axially rear (at the right in FIGS. 1, 2), radially upper (at the top in FIG. 1) half of the pressure sides.

Trailing edges 12 of first flow-directing elements 10 (indicated by a dashed line in FIG. 1) are axially offset from trailing edges 22 of second flow-directing elements 20 in a direction toward the leading edge (to the left in FIG. 1) in a strictly monotonically increasing fashion along airfoil height h in a half proximate to the airfoil tip (the upper one in FIG. 1), the (maximum) offset at the airfoil tip being at least 0.5% and no more than 15% of the length of the chord at the airfoil tip. It can be seen in FIG. 1 that the offset is in a region between 50% and 100% of airfoil height h, as measured from the rotor or airfoil root; i.e., in the upper half h/2 located above section line II-II.

This makes it possible to reduce, preferably prevent, flutter of flow-directing elements 10, 20 during a backflow $c_P$ due to pumping.

In addition, the first flow-directing elements, which, accordingly, are aerodynamically less loaded, have a different bending and torsional stiffness than the second flow-directing elements, so that their bending and torsional natural frequencies, in particular their first bending and torsional natural frequencies, are different, whereby the flow-directing elements already aerodynamically mistuned by the cutback of the trailing edges are, in addition, also structurally mistuned.

Although the above is a description of exemplary embodiments, it should be noted that many modifications are possible. It should also be appreciated that the exemplary embodiments are only examples, and are not intended to limit scope, applicability, or configuration in any way. Rather, the foregoing description provides those skilled in the art with a convenient road map for implementing at least one exemplary embodiment, it being understood that various changes may be made in the function and arrangement of elements described without departing from the scope of protection set forth in the appended claims and their equivalent combinations of features.

LIST OF REFERENCE NUMERALS

10(20) first(second) flow-directing element
11(21) leading edge
12(22) trailing edge
13(23) pressure side
14(24) suction side
15(25) airfoil root
16(26) airfoil tip

What is claimed is:

1. An array of flow-directing elements for a compressor of a gas turbine, the array comprising:
    at least one first flow-directing element; and
    at least one second flow-directing element different from the first flow-directing element; the first and second flow-directing elements each having a leading edge facing an inlet of the gas, a trailing edge facing away from the gas turbine inlet, a pressure side connecting the leading edge and the trailing edge and located ahead in a direction of operational rotation, a suction side located opposite of the pressure side, and successive chords along a stacking axis; the first and second flow-directing elements each extending between an airfoil root and an airfoil tip;
    the trailing edge of the first flow-directing element being, at least in a portion thereof, axially offset from the trailing edge of the second flow-directing element in a direction toward the leading edge of the first flow-directing element, at least in a half proximate to the airfoil tip; and
    at least one third flow-directing element having a third flow-directing trailing edge and a third flow-directing leading edge, at least in a portion thereof, axially offset from the trailing edges of the first and second flow-directing elements in a direction toward the third flow-directing leading edge;
    wherein the trailing edge of the first flow-directing element is, at least in a portion thereof, offset from the trailing edge of the second flow-directing element by at least 0.5% and no more than 15% of a chord length of the first flow-directing element.

2. The array of flow-directing elements as recited in claim 1 wherein the trailing edge of the first flow-directing element is, at least in a portion thereof, axially offset from the trailing edge of the second flow-directing element, the second flow directing element being adjacent to the first flow directing element, in a direction toward the leading edge at least in a third proximate to the airfoil tip.

3. The array of flow-directing elements as recited in claim 1 wherein the trailing edge of the first flow-directing element is, at least in a portion thereof, offset from the trailing edge of the second flow-directing element by at least 1% and no more than 10% of a chord length of the first flow-directing element.

4. The array of flow-directing elements as recited in claim 1 wherein the trailing edge of the first flow-directing element is offset from the trailing edge of the second flow-directing element in an increasing fashion toward the airfoil tip.

5. The array of flow-directing elements as recited in claim 4 wherein the trailing edge of the first flow-directing element is offset from the trailing edge of the second flow-directing element in a monotonically increasing fashion toward the airfoil tip.

6. The array of flow-directing elements as recited in claim 1 wherein the first and second flow-directing elements have natural frequencies differing by at least 1% or no more than 20%.

7. The array of flow-directing elements as recited in claim 6 wherein the natural frequencies are first or second frequencies.

8. The array of flow-directing elements as recited in claim 6 wherein the natural frequencies are bending or torsional natural frequencies.

9. The array of flow-directing elements as recited in claim 1 wherein the first flow-directing element has a different bending stiffness or torsional stiffness than the second flow-directing element.

10. The array of flow-directing elements as recited in claim 9 wherein the first flow-directing element has the different bending stiffness or torsional stiffness than the second flow-directing element in at least in the half proximate to the airfoil tip.

11. The array of flow-directing elements as recited in claim 9 wherein the first flow-directing element has a lower bending stiffness or torsional stiffness than the second flow-directing element.

12. A rotor blade or stator blade array comprising the array of flow directing elements as recited in claim 1.

13. A gas turbine comprising at least one compressor stage including an array of flow-directing elements as recited in claim 1.

14. The gas turbine as recited in claim 13 wherein the compressor stage is a high-pressure compressor stage.

15. An aircraft engine gas turbine comprising the gas turbine as recited in claim 13.

16. A method for designing an array of flow-directing elements as recited in claim 1 comprising axially offsetting the trailing edge of the first flow-directing element, at least in a portion thereof, from the trailing edge of the second flow-directing element in a direction toward the leading edge in a half proximate to the airfoil tip.

17. The array of flow-directing elements as recited in claim 1 wherein the trailing edge of the third flow-directing element is, at least in a portion thereof, offset from the trailing edge of the second flow-directing element by at least 0.5% and no more than 15% of a chord length of the first, second, or third flow-directing element.

18. The array of flow-directing elements as recited in claim 17 wherein the trailing edge of the third flow-directing element is, at least in a portion thereof, offset from the trailing edge of the first flow-directing element by at least 0.5% and no more than 15% of a chord length of the first, second, or third flow-directing element.

19. The array of flow-directing elements as recited in claim 1 wherein the trailing edge of the third flow-directing element is, at least in a portion thereof, offset from the trailing edge of the first flow-directing element by at least 0.5% and no more than 15% of a chord length of the first, second, or third flow-directing element.

\* \* \* \* \*